(12) United States Patent
Anderson et al.

(10) Patent No.: US 6,605,777 B1
(45) Date of Patent: Aug. 12, 2003

(54) EARTHQUAKE-RESISTANT ELECTRONIC EQUIPMENT FRAME

(75) Inventors: Thomas E. Anderson, South Barrington, IL (US); Jerry L. Young, Lockport, IL (US)

(73) Assignee: Amco Engineering Co., Schiller Park, IL (US)

(*) Notice: Subject to any disclaimer, the term of this patent is extended or adjusted under 35 U.S.C. 154(b) by 0 days.

(21) Appl. No.: 10/207,522

(22) Filed: Jul. 29, 2002

(51) Int. Cl.[7] .................................................. H02G 3/08
(52) U.S. Cl. ..................... 174/50; 312/265.1; 312/265.4
(58) Field of Search ................................ 174/50, 17 R, 174/48, 53, 54, 63; 312/265.1, 265.4, 265.3, 265.5, 265.6, 257.1, 263, 140, 111, 264; 361/724, 725, 824, 827, 265; 52/653.1, 653.2; 211/26, 186, 189, 191; 379/325, 327

(56) References Cited

U.S. PATENT DOCUMENTS

| | | | |
|---|---|---|---|
| 3,034,844 A | | 5/1962 | Anderson et al. |
| 4,754,369 A | * | 6/1988 | Nilsson ...................... 361/724 |
| 4,899,892 A | * | 2/1990 | Rheault ....................... 211/26 |
| 5,165,770 A | * | 11/1992 | Hahn ...................... 312/265.4 |
| 5,250,752 A | * | 10/1993 | Cutright .................... 174/35 R |
| 5,292,189 A | * | 3/1994 | Lau et al. ................. 312/265.3 |
| 5,323,916 A | * | 6/1994 | Salmon ........................ 211/26 |
| 5,372,262 A | * | 12/1994 | Benson et al. ................ 211/26 |
| 5,380,083 A | * | 1/1995 | Jones et al. .............. 312/265.3 |
| 5,383,723 A | * | 1/1995 | Meyer ..................... 312/265.4 |
| 5,536,079 A | * | 7/1996 | Kostic ..................... 312/265.3 |
| 5,619,837 A | * | 4/1997 | DiSanto ..................... 52/798.1 |
| 5,639,150 A | * | 6/1997 | Anderson et al. ........ 312/265.3 |
| 5,806,946 A | * | 9/1998 | Benner et al. ........... 312/265.3 |
| 5,819,956 A | * | 10/1998 | Rinderer ...................... 211/26 |
| 5,979,672 A | | 11/1999 | Gemra et al. |
| 6,132,017 A | * | 10/2000 | Gallegos .................. 312/140.1 |
| 6,164,737 A | * | 12/2000 | Benner et al. ........... 312/265.5 |
| 6,202,860 B1 | * | 3/2001 | Ludwig ........................ 211/26 |
| 6,217,138 B1 | * | 4/2001 | Benner et al. ........... 312/265.4 |
| 6,238,028 B1 | * | 5/2001 | Benner et al. ........... 312/265.3 |
| 6,293,637 B1 | | 9/2001 | Anderson et al. |

FOREIGN PATENT DOCUMENTS

| | | |
|---|---|---|
| CA | 642359 | 6/1962 |
| DE | 26 31 976 | 1/1978 |
| GB | 2 095 101 | 9/1982 |

* cited by examiner

*Primary Examiner*—Dean A. Reichard
*Assistant Examiner*—Angel R. Estrada
(74) *Attorney, Agent, or Firm*—Marshall, Gerstein & Borun

(57) ABSTRACT

An electronic equipment frame has two side assemblies each formed of two separate configured corner support channel members rigidly connected by welding by a series of cross struts, and rigidly welded to separate top panel and bottom panel assemblies, with each corner support channel member having a deep, flat-bottomed, V-shaped central channel portion where the angled sidewalls extend to the same depth as the outer end walls of the corner support channel member. The respective ends of each corner support channel member also have extension length portions which permit extended length weld areas for rigidly connecting the respective top and bottom panel assemblies thereto.

21 Claims, 12 Drawing Sheets

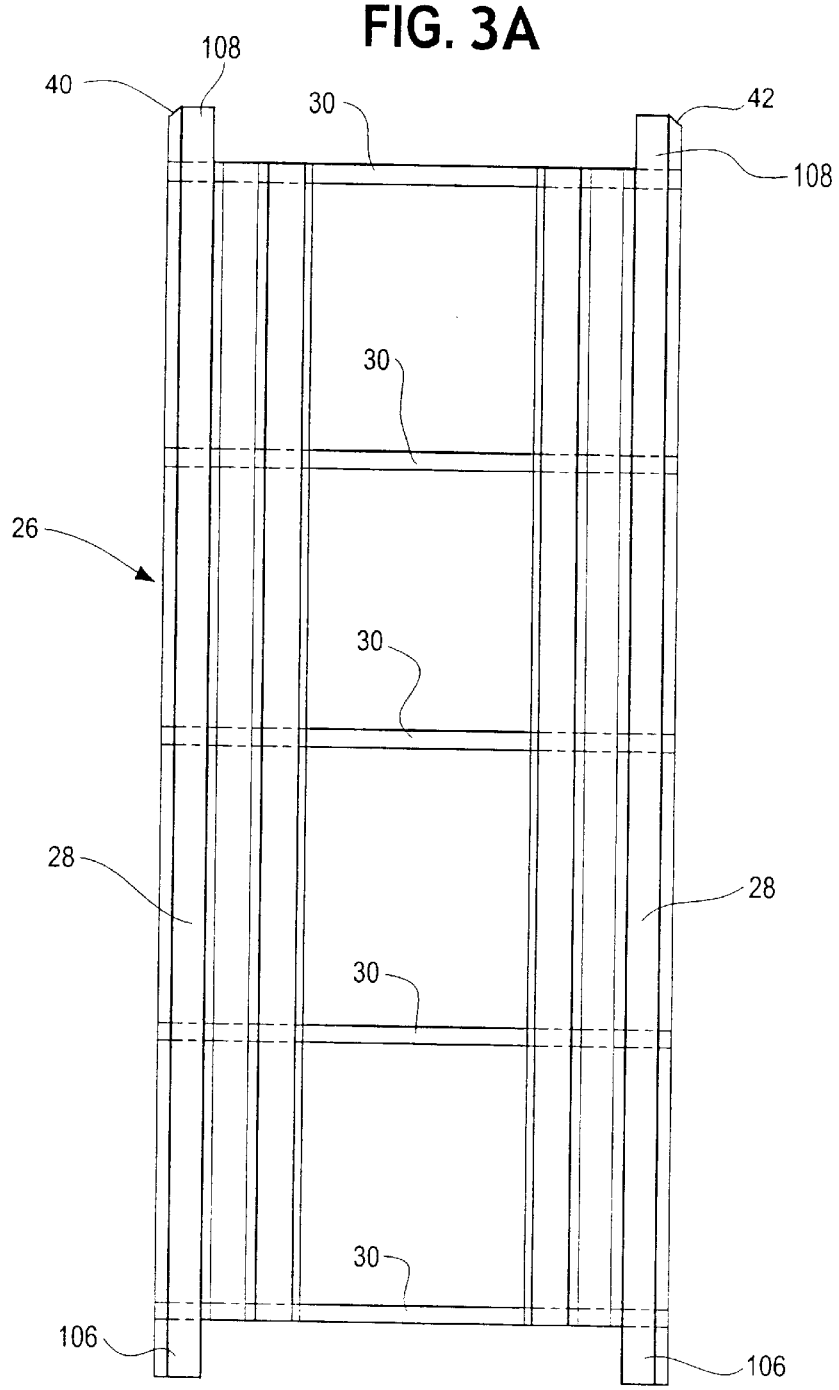
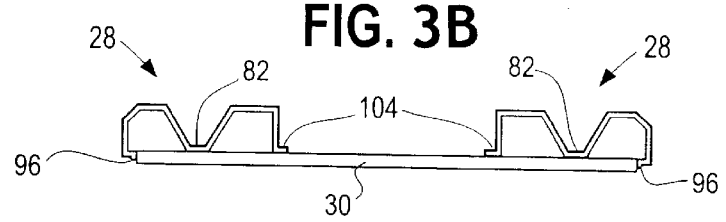

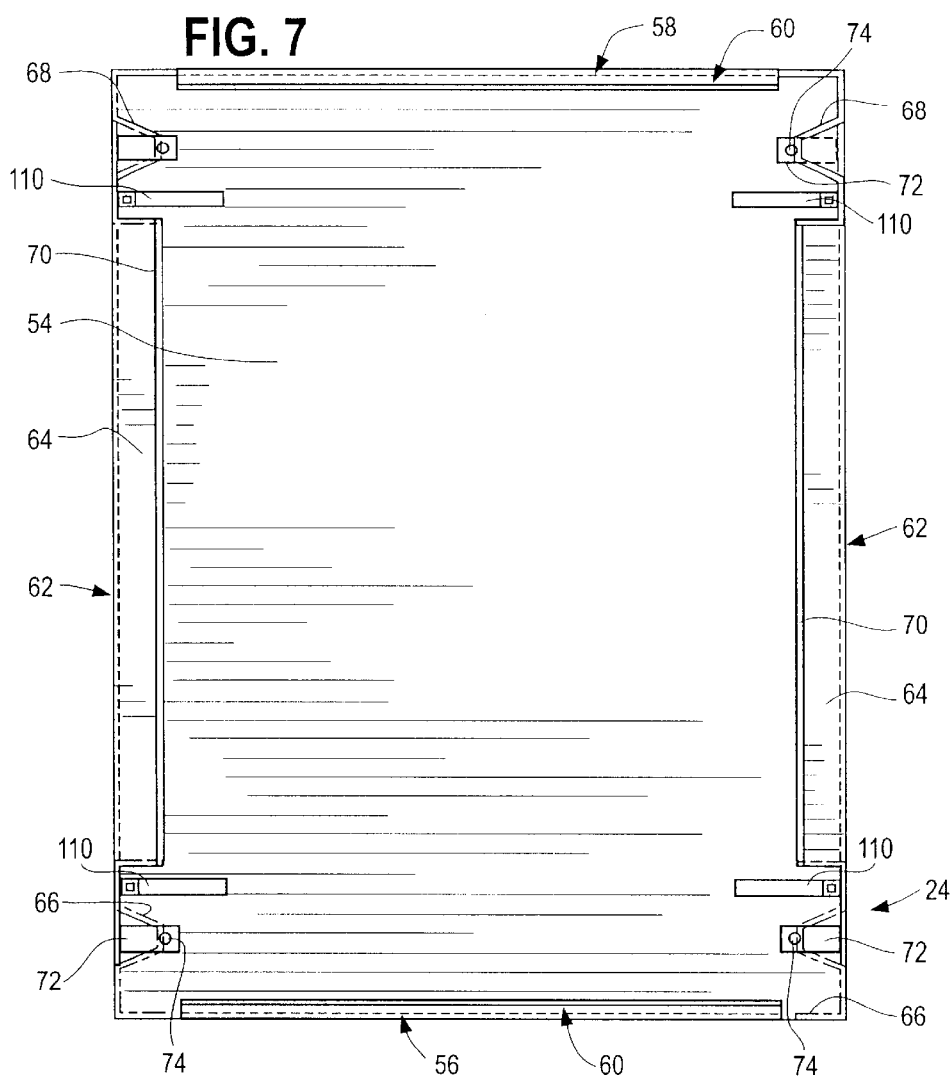
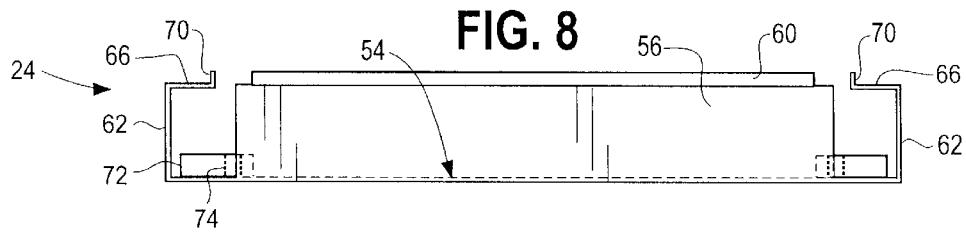
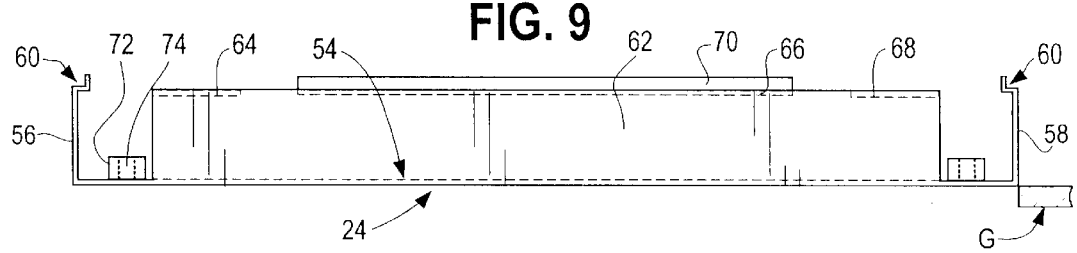

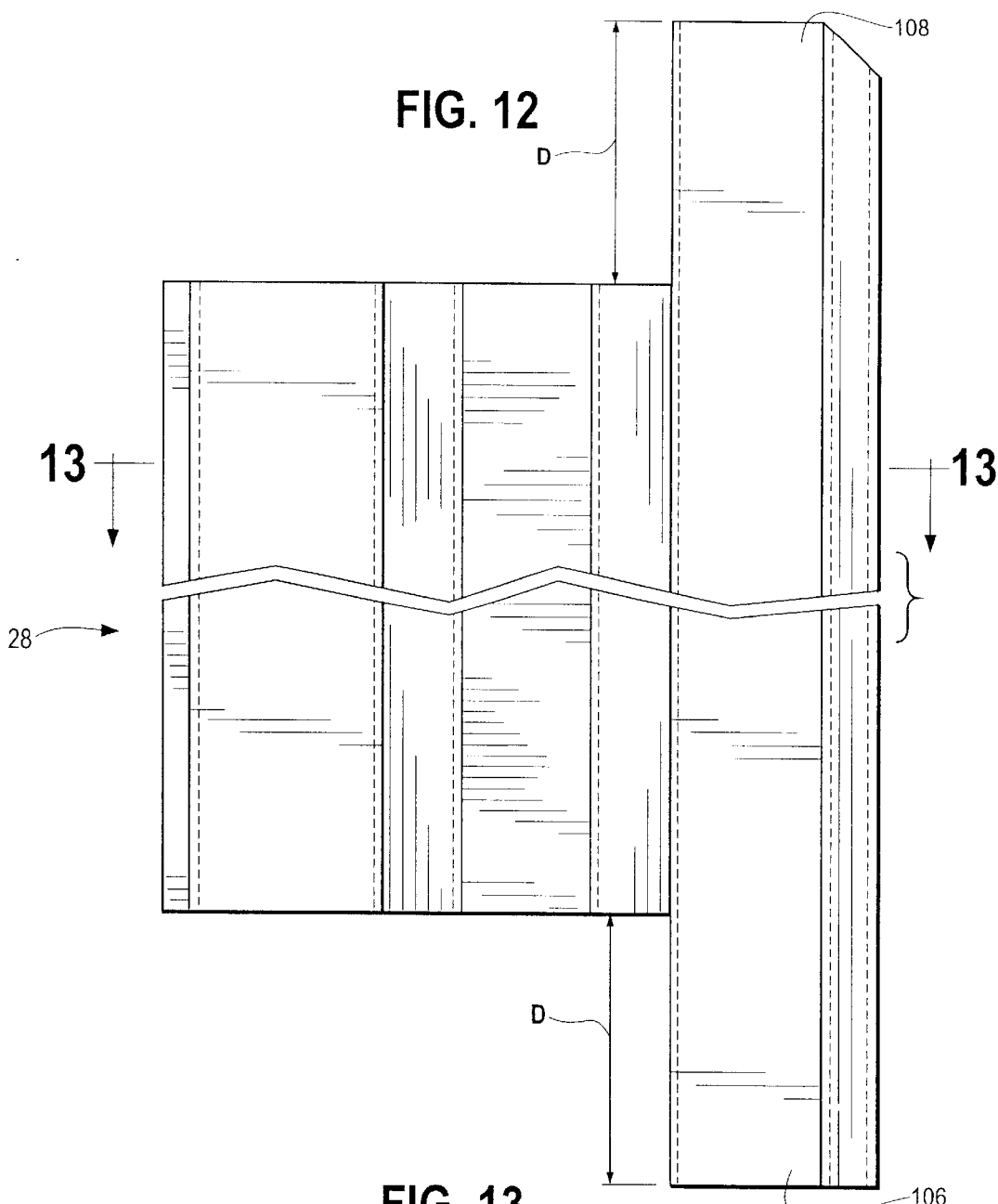
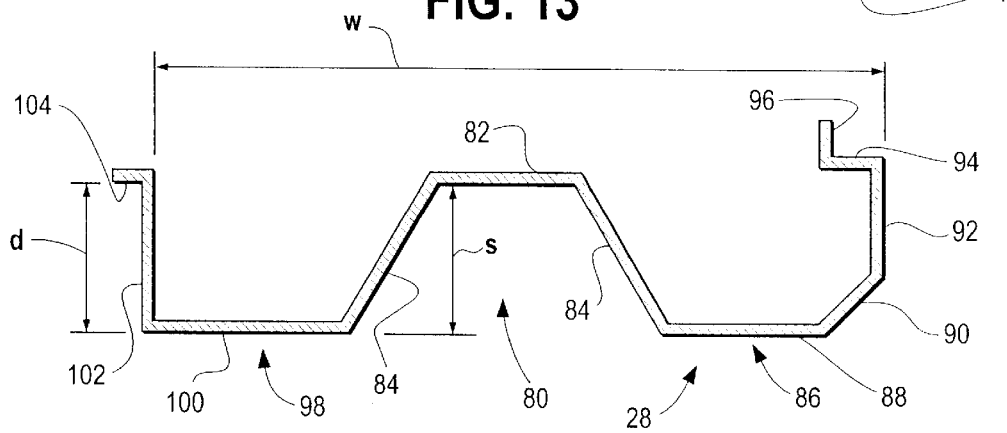

FIG. 17
FIG. 17a
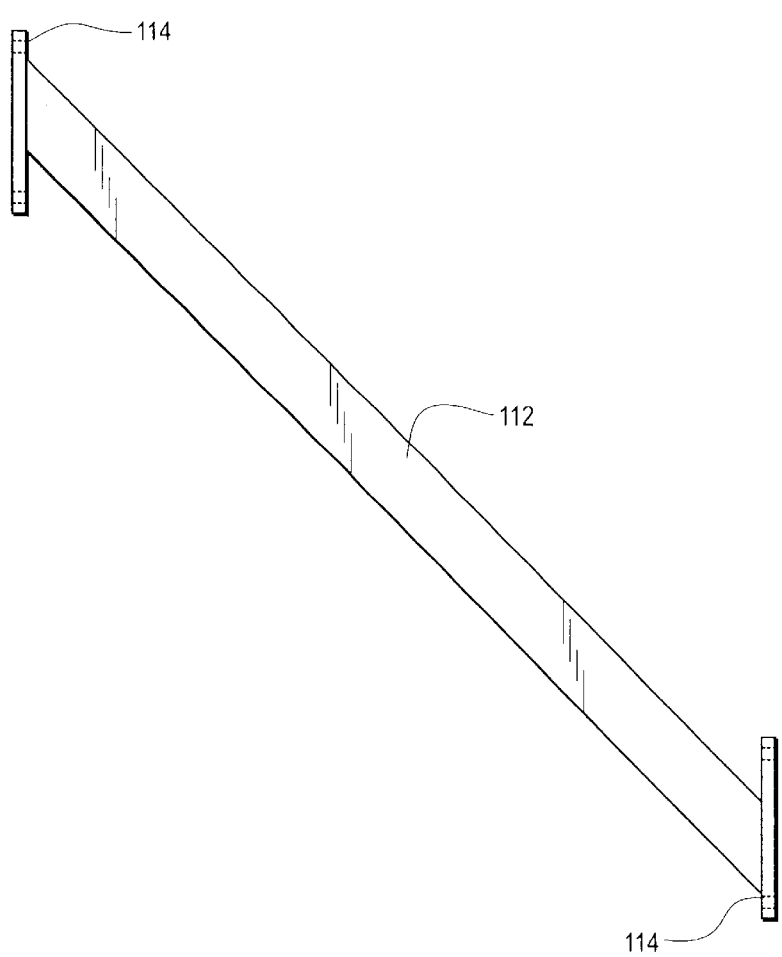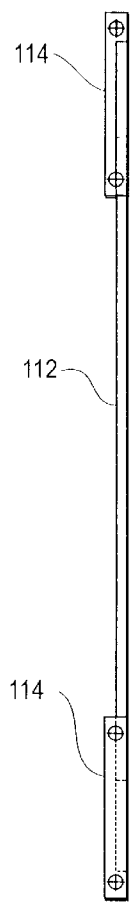

EARTHQUAKE-RESISTANT ELECTRONIC EQUIPMENT FRAME

FIELD OF THE INVENTION

This invention relates to electronic equipment frames and enclosures, and more particularly to those that can better withstand side-to-side vibration forces so as to be better resistant to damage due to earthquakes, explosions, and other tremor-related activity.

BACKGROUND OF THE INVENTION

There is an ever-increasing demand for higher force tolerance to earthquakes and other tremors for electronic equipment frames and enclosures (i.e. cabinets). See the Background of the Invention section in U.S. Pat. No. 6,293,637, issued Sep. 25, 2001, entitled "Earthquake-Resistant Electronic Equipment Frame", owned by the same assignee of the present invention, and which section is incorporated herein by reference. That patent teaches an improved side support channel for such frames as formed of a specific corrugated shape. There is also U.S. Pat. No. 5,979,672, entitled "Earthquake-Resistant Electronic Equipment Frame," where the disclosed electronic equipment enclosure utilizes a unitized or monocoque-type enclosure formed of one continuous corrugated panel.

Note also U.S. Pat. No. 5,639,150, entitled Electronic Component Enclosure and Method, as also assigned to the assignee of the present invention, where the equipment frame utilizes a side support channel which had a chamfered corner profile. In that particular unit's frame, the top and bottom panels were formed as separate bolt-on units, i.e. members not integrally connected to the overall equipment frame. Further, the unit required the presence of additional front door, rear door, and side panels to allow the unit to achieve the overall strength that that particular enclosure had been designed to withstand, i.e. it required extra components to be able to pass the so-called Seismic 4 testing criteria.

Another known shape for a corner member of an electronic equipment frame, and particularly one with corner support members having a V-tapered type corrugated profile, is U.S. Pat. No. 4,899,892.

However, notwithstanding all the above prior equipment frame designs, none permit the frame's overall center of mass (e.g. of the combination of equipment shelves, the electronic equipment itself, and related wiring) to be at a sufficiently high location as currently desired by end-users of such frames. Moreover, none of the above prior art units achieve the needed overall permitted weight for a given frame, while still passing the required Seismic 4 testing, all to address the ever-increasing industry need for such increased weight limits.

SUMMARY OF THE INVENTION

The present invention comprises an earthquake-resistant electronic equipment frame made with four corner support channels, each support channel having a generally corrugated profile, including a deep center V-grooved channel, a chamfered outer corner, and deep end flanges with returned lip portions, permitting increased resistance against side-to-side forces. Each side support channel is preferably formed of heavy gauge, i.e. preferably 11 gauge, cold-rolled steel. A series of so-called "Unistrut" (Trademark) cross strut members, which combine with the main corner support channels to make an integral frame member, are used to provide extra strength. Further, the respective top and bottom panel assemblies are integrally connected by welding to the respective main corner support channels so that each top and bottom assembly becomes an integral unit with the overall frame. Further, the front and rear top corner edges of the top panel assembly are chamfered, similar to the outer chamfered corner edges of the four main corner support channels, to provide yet further side-to-side resistance to vibration forces.

In an alternate embodiment, additional structure in the form of "X"-bracing, i.e. cross bracing, is utilized across the rear opening of the present equipment frame to provide yet additional side-to-side vibration force resistance.

In testing, it has been shown that a equipment frame made in accordance with the present invention will achieve much higher Seismic 4 test results than even those available with the frame made in accordance with the invention of U.S. Pat. No. 6,293,637, or with any other known equipment frame, for that matter. Importantly, such higher test results are achieved without the addition of side panels or doors to the present equipment frame. Also, the center of the overall increased weight achievable with the present equipment frame can be located at up to approximately 65 percent of the overall height of the present frame. That is a height much higher than achievable with any of the known prior equipment frames.

BRIEF DESCRIPTION OF THE DRAWINGS

The means by which the foregoing and other aspects of the present invention are accomplished and the manner of their accomplishment will be readily understood from the following specification upon references to the accompanying drawings, in which:

FIG. 3A is an elevation view of only the two main corner support channels and cross strut members forming the right side of the equipment frame of FIG. 1, with other parts deleted for better viewing, and with the left side view being a minor image thereof;

FIG. 3B is a top plan view of the right side of the equipment frame of FIG. 3A;

FIG. 7 is a bottom plan view of the bottom panel assembly of the equipment frame of FIG. 1;

FIG. 8 is a front elevation view of the bottom panel assembly of FIG. 7;

FIG. 9 is a side elevation view of bottom panel assembly of FIG. 7;

FIG. 12 is a fragmented side elevation view of the main corner support channel of the equipment frame of FIG. 1;

FIG. 13 is a across section of the main corner support channel of FIG. 12, taken at lines 13—13 thereof;

FIG. 17 depicts a front plan elevation view of one of the diagonal cross brace members for an alternate embodiment of the present invention; and FIG. 17a depicts a side elevation view of the base member of FIG. 17.

DETAILED DESCRIPTION OF THE INVENTION

Figure 1:
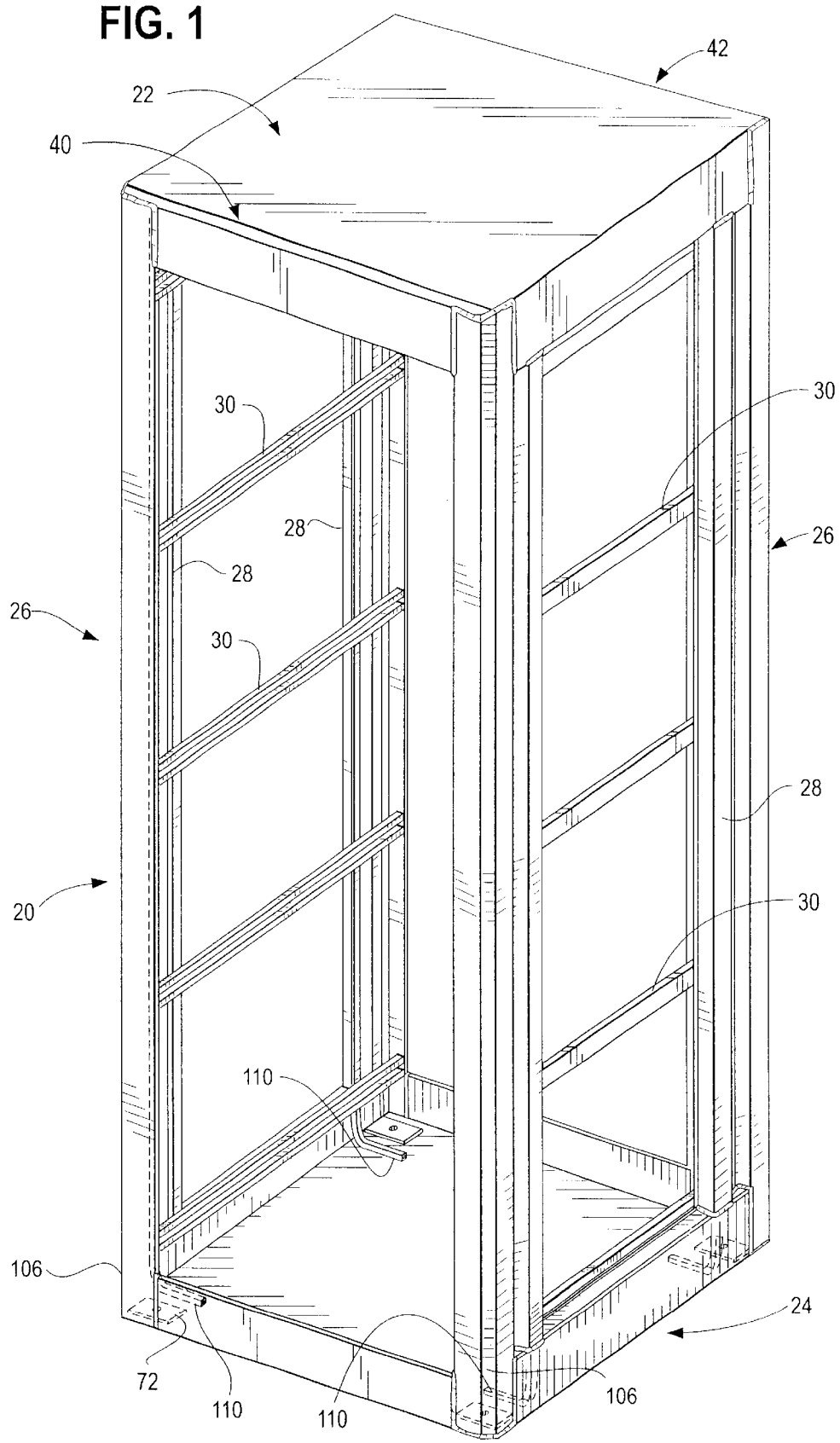
FIG. 1 is a perspective view of the improved earthquake-resistant electronic equipment frame of the present invention.

Having reference to the drawings, wherein like reference numerals indicate corresponding elements, there is shown in FIG. 1 an illustration of the improved earthquake-resistant electronic equipment frame of the present invention, generally denoted by reference numeral 20. The frame 20 comprises a top panel assembly 22, a bottom panel assembly 24, and two respective side assemblies 26. All are preferably formed of welded-up metal components, such as bent-up, cold-rolled sheet steel members.

Figure 10:
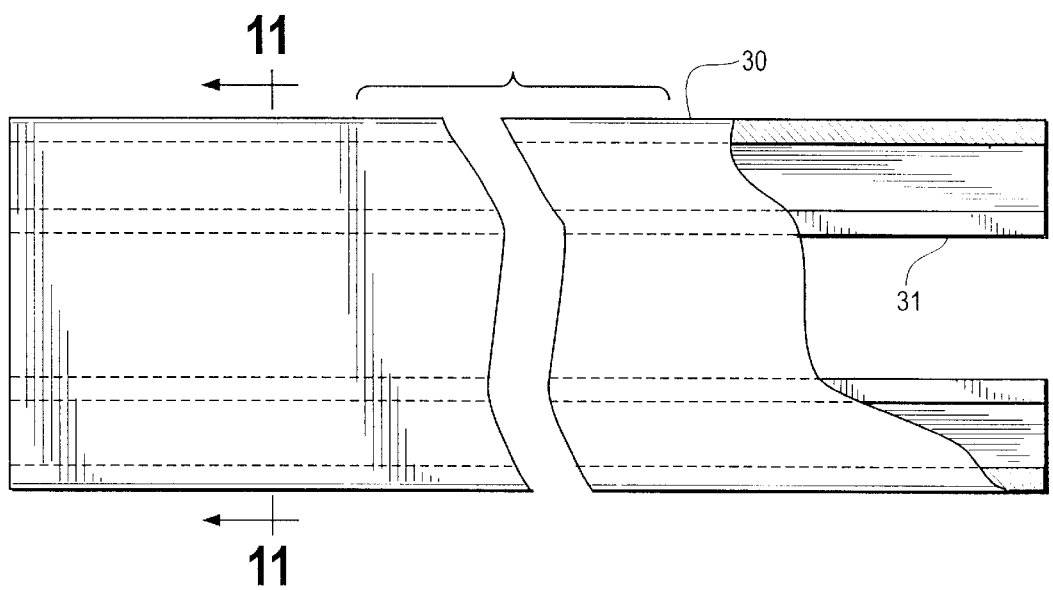
FIG. 10 is a side elevation view of a so-called "Unistrut" cross strut of the equipment frame of FIG. 1.
Figure 11:
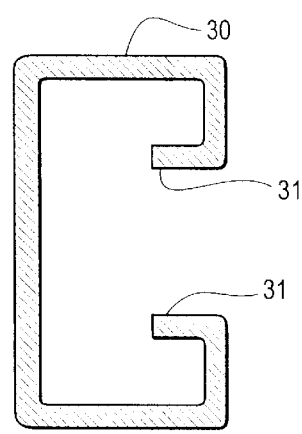
FIG. 11 is a cross section of the cross strut of FIG. 10, taken at lines 11—11 thereof.
Figure 14A:
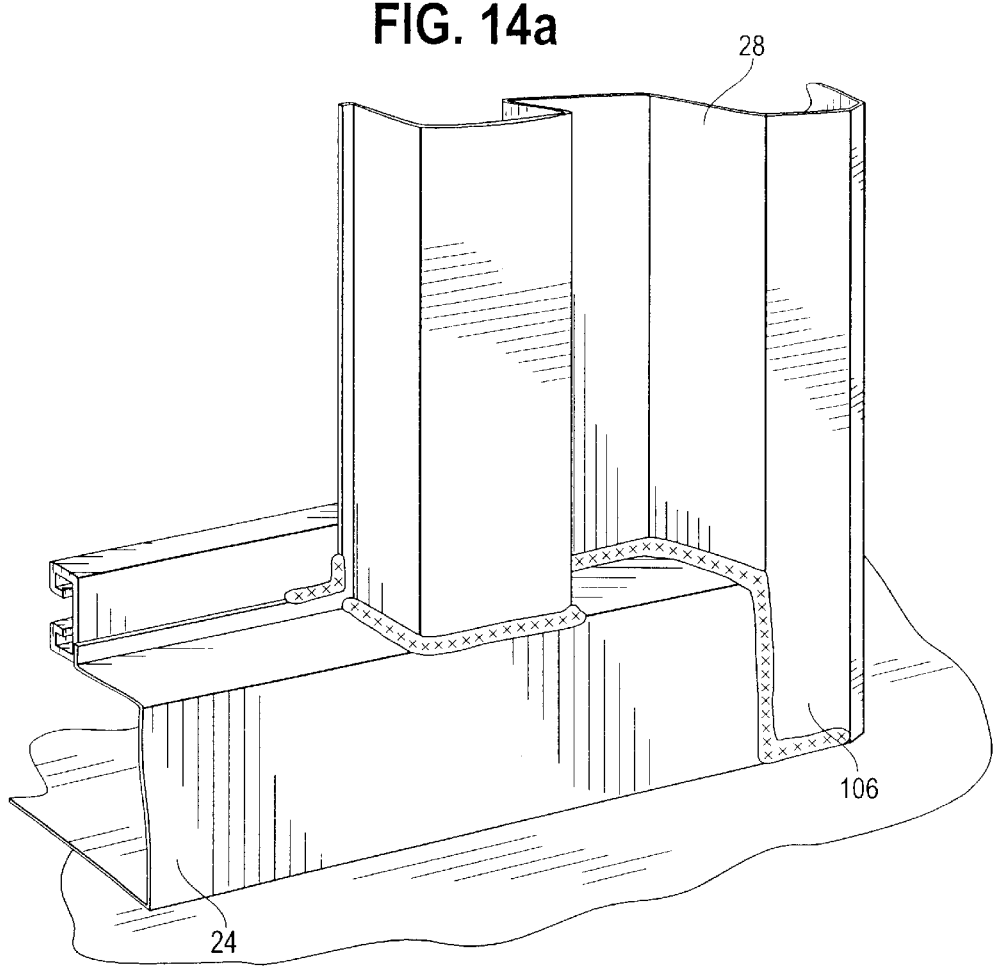
FIG. 14a is a fragmented perspective view of the bottom front corner of the equipment frame of FIG. 1, depicting the various improved weld length areas of the present invention.
Figure 14B:
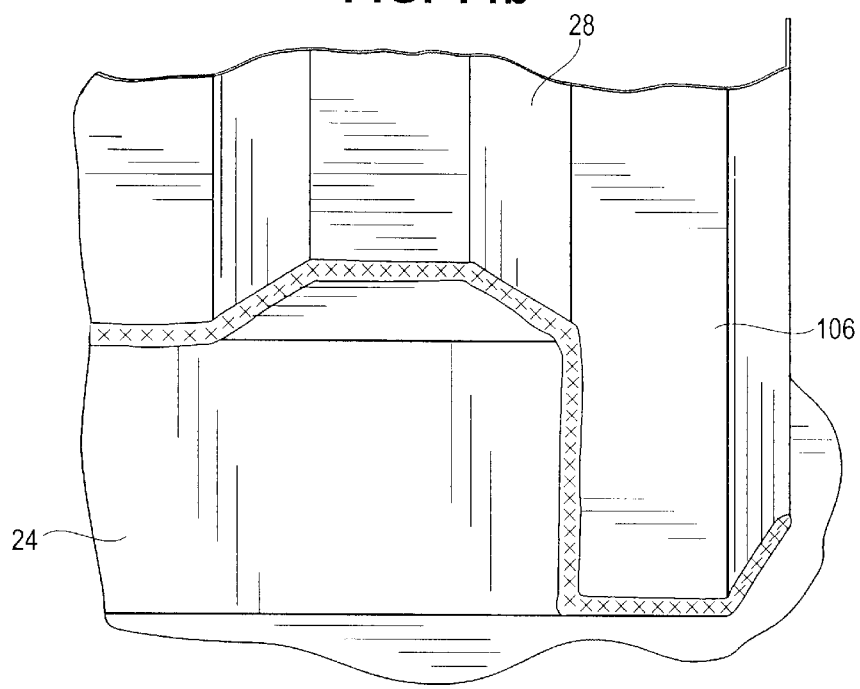
FIG. 14b is a slightly altered perspective of the view of the same corner depicted in FIG. 14a, to yet better depict the improved weld length areas of the present invention.
Figure 15A:
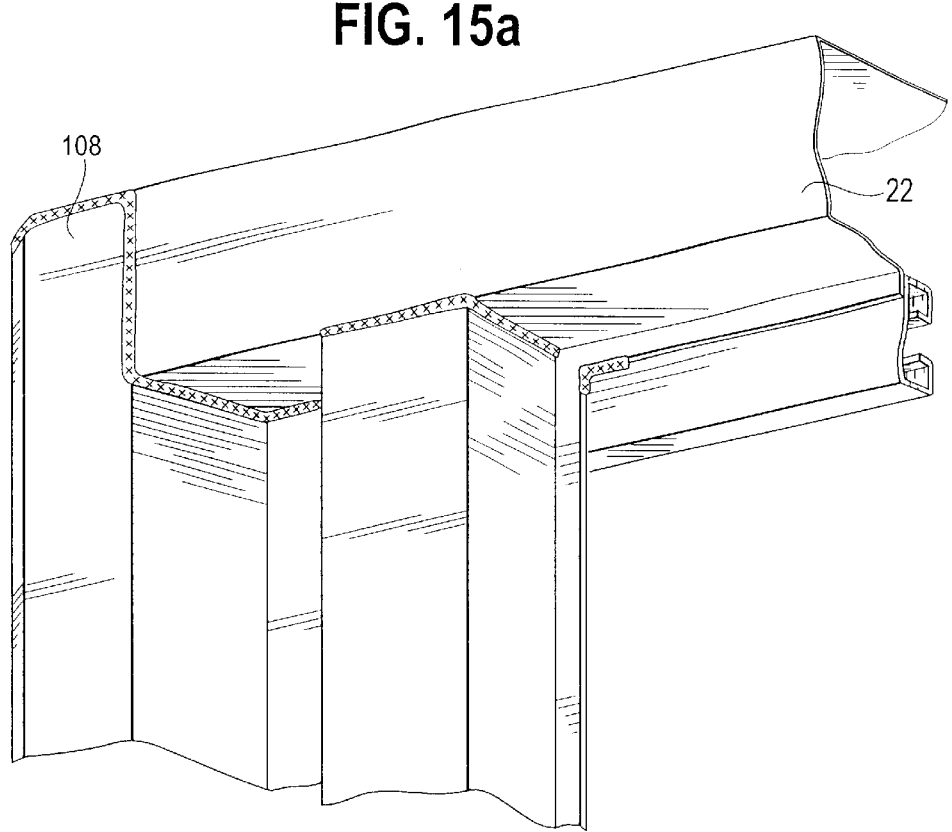
FIG. 15a is a fragmented perspective view of the top front corner of the equipment frame of FIG. 1, depicting the various improved weld length areas of the present invention.
Figure 15B:
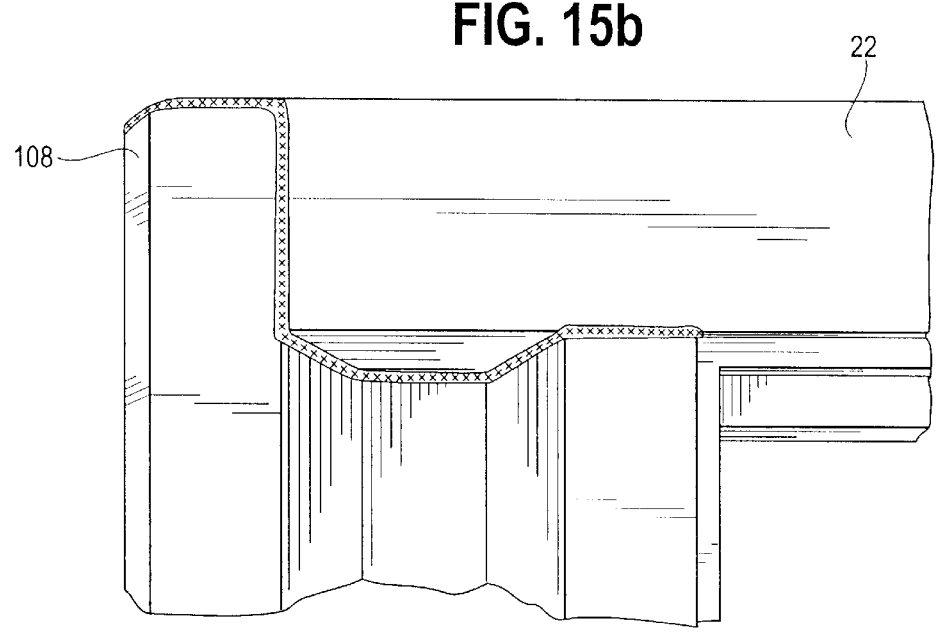
FIG. 15b is a slightly altered perspective view of the same corner depicted in FIG. 15a, to yet better depict the improved weld length areas of the present invention.
Figure 16:
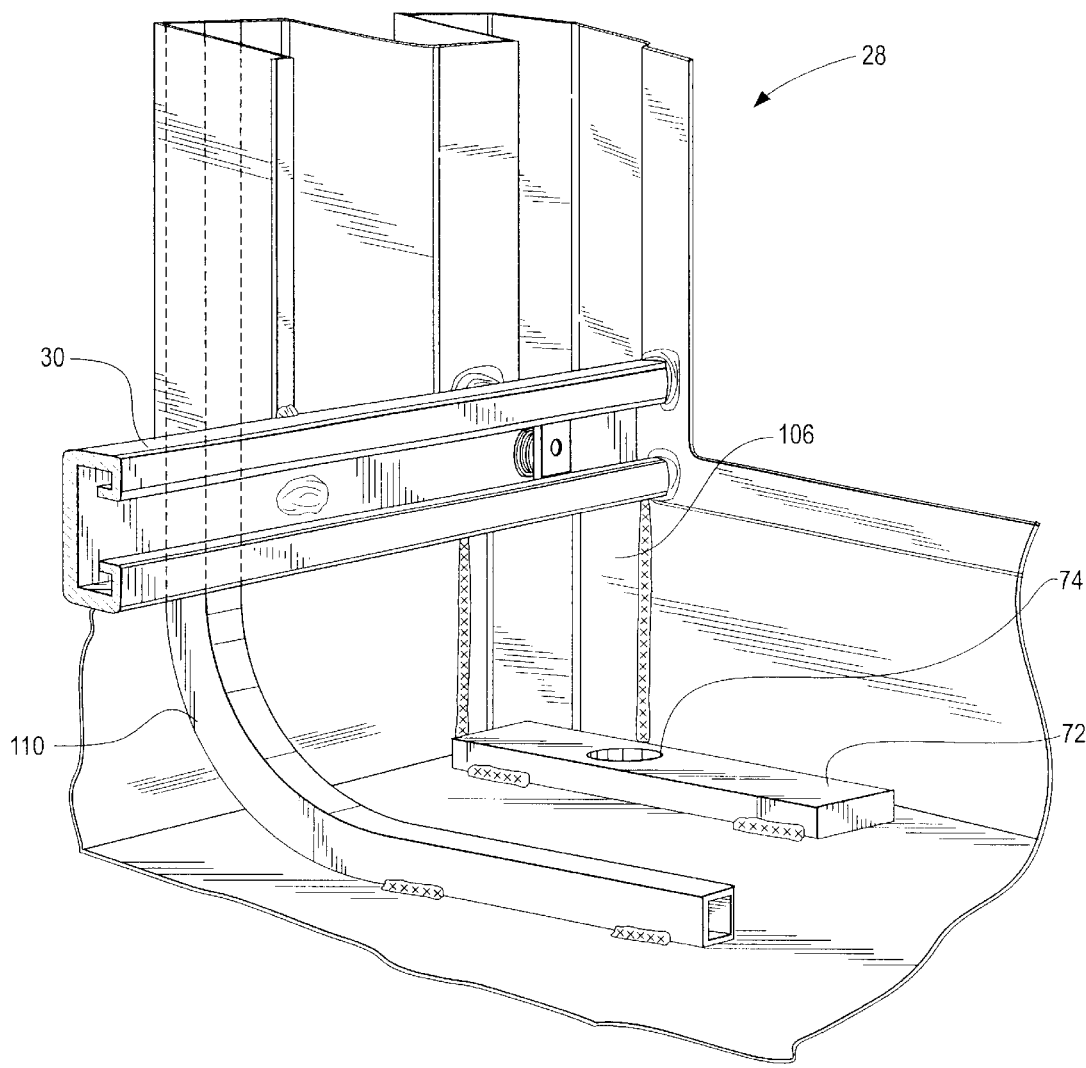
FIG. 16 is a perspective view of a lower interior front corner of the equipment frame of the present invention, and showing a curved, generally L-shaped tube support member, an anchor plate, and Unistrut channel, and some of the improved weld length areas of the present invention.

As best seen in FIGS. 1 and 3A, each side assembly 26 is an integrally formed unit including two primary corner support channels each in the form of a main specially-configured, corrugated and chamfered support member 28, and a series (preferably five) of cross strut members 30 rigidly anchored by welding therebetween. Each cross strut member (see FIGS. 10 and 11) preferably comprises a so-called "Unistrut" (Trademark) channel, which is formed as an open channel member having down-turned flanges 30. In use, each cross strut 30 acts like a tube-type member for strength purposes, rather than simply as an open channel.

The top panel assembly 22, bottom panel assembly 24 and respective side panel assemblies 26 are all preferably formed of 11 gauge sheet steel to provide substantial extra strength to withstand high vibration forces, particularly side-to side forces that equipment frame 20 can be subjected to, such as during earthquakes, explosions, and other tremor-related activity.

Figure 4:
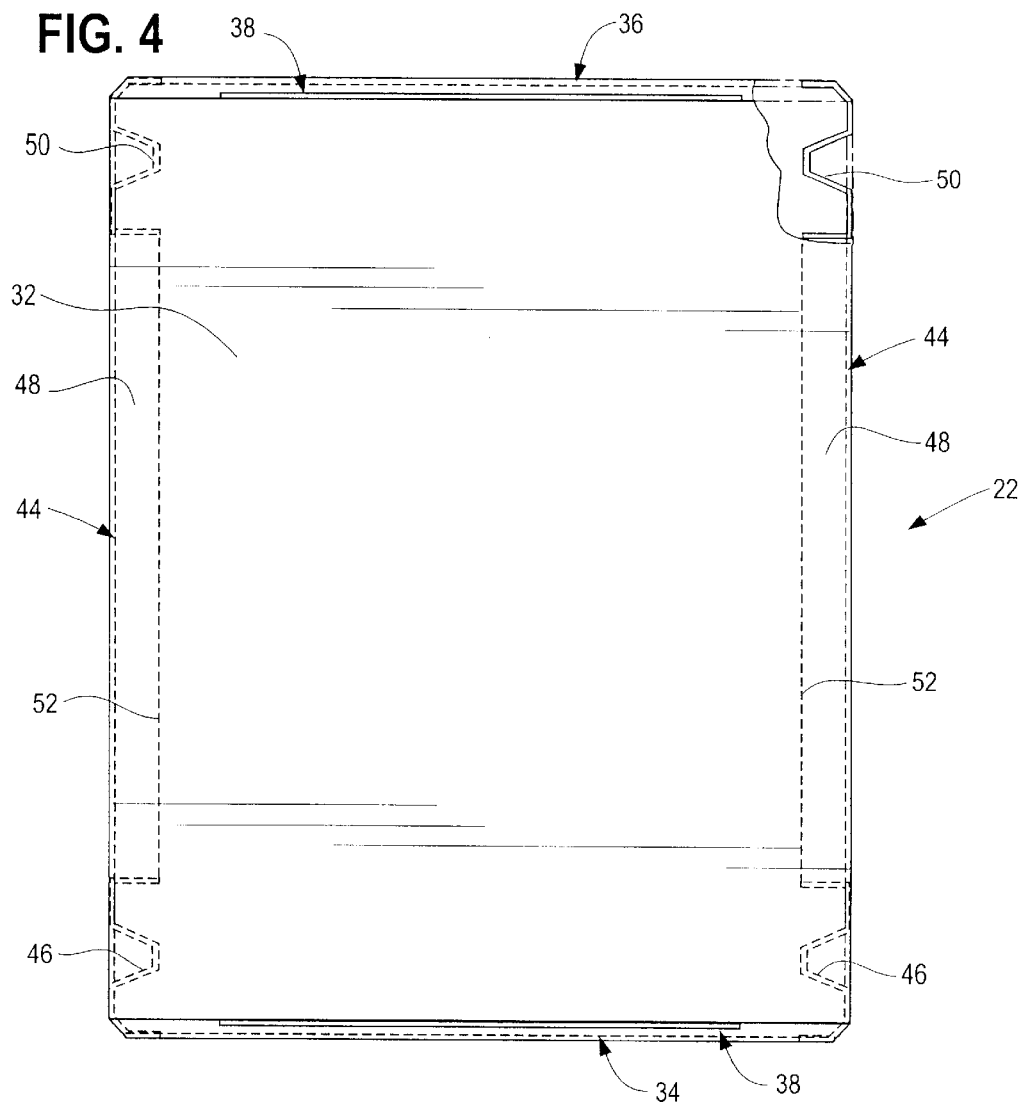
FIG. 4 is a top plan view of the top panel assembly of the equipment frame of FIG. 1.
Figure 5:
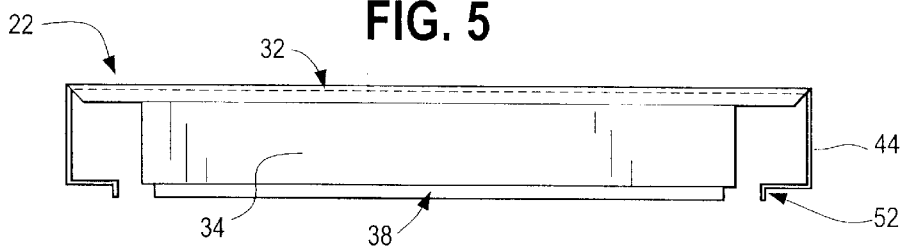
FIG. 5 is a front elevation view of the top panel assembly of FIG. 4.
Figure 6:
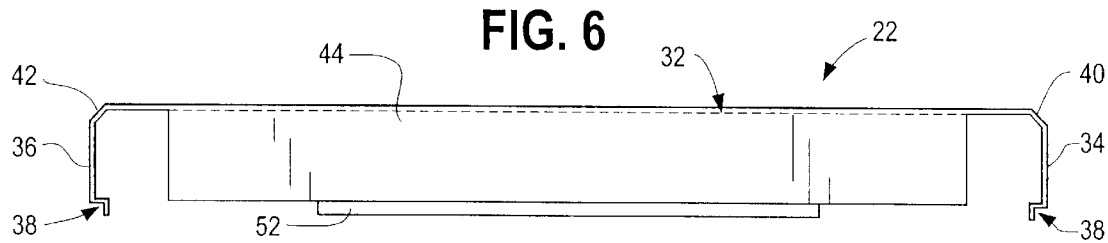
FIG. 6 is a side elevation view of the top panel assembly of FIG. 4.

As seen in FIGS. 4–6, the top panel assembly 22 is formed with a top panel 32 which terminates in front and rear drop panel edges 34, 36, and each of edges 34, 36 terminates in a lower bent lip portion 38. FIG. 6 depicts the chamfered front edge 40 and chamfered rear edge 42 for top panel assembly 22. It will be understood that such chamfered top edges 40 and 42 assist in providing the substantial overall strength against side-to-side vibrations present in frame 20 of the present invention.

As seen in FIGS. 4 and 5 the top panel assembly includes side drop panel portions 44 with respective bent lip portions 46, 48 and 50. As will be noted in FIGS. 4–6, none of drop panel portions 34, 36, 44 extend the full length of the respective sides of the top panel 32. Bent lip portion 48 also includes a bent edge 52.

Bottom panel assembly 24 (see FIGS. 7–9) comprises a bottom panel 54, with bent up front panel edge 56 and bent up rear panel edge 58, each terminating in a bent lip portion 60. There are also side raised panel portions 62, and depending therefrom respective bent lip portions 64, 66, 68. Bent lip portion 66 further terminates in a further bent lip 70.

FIG. 7 depicts a series of anchor plates 72 rigidly affixed, e.g. welded, to bottom panel 54, with respective openings 74 to receive a threaded fastener (not shown) to anchor the bottom panel assembly 24, and therefore the integrally connected electronic equipment frame 20, to an appropriate ground or floor surface (as denoted generally by reference G in FIG. 9).

As best seen in FIGS. 12 and 13, each main corner support channel 28 comprises a central substantially V-shaped, flat-bottomed channel section 80 comprising a bottom wall 82 and two angled side walls 84. At one end of the V-shaped channel section 80 an outer corner section 86 comprising a main wall 88, a chamfered corner wall 90, an outer end wall 92, with a flange wall 94 that terminates in a return lip 96, plus at the outer end of the central V-channel section 80 there extends an inner corner section 98 comprising a second main wall 100 and an inner end wall 102 that terminates in a bent lip portion 104. The fact that the two angled side-walls 84 respectively extend (from first main wall 88 and second main wall 100) to the full length, i.e. full depth, of the two end walls 92, 102, contributes significantly to the overall side-to-side vibration resistance strength provided by each main corner support channel 28. The two angled side walls 84 extend from said bottom wall 82 at an angle of approximately 120°. Preferably, each main corner support channel 28 is formed, i.e. bent-up, from a cold-rolled steel material and is preferably 11-gauge material (i.e. approximately 0.119 inch thick). Use of such relatively heavy gauge material for the four main corner support channels 28 provides substantial additional strength to the overall equipment frame 20 of the present invention. Further, so as to achieve the proper rigidity and strength for the configured corner support channels 28, so they can provide adequate side-to-side vibration resistance strength to the frame 20, the full depth-to-width ratio for the cross sectional dimensions of a channel 28 (see respective "d" and "w" dimensions in FIG. 13) is no more than 1 to 5.5, and preferably in the range of only 1 to 4.9, to 1 to 4.1.

As seen in FIG. 3B, each cross strut member 30 is rigidly connected by welding to the respective corner support channels 28 along the rear side of bottom wall 82, and also to return lip 96 and bent lip 104. This helps further strengthen the overall equipment frame 20.

As best seen in FIG. 12, each of the outer respective ends of each main corner support channel 28 is especially formed so that the various components forming the outer corner section 86 (i.e. wall elements 88, 90, 92, 94, 96) all extend an extra distance (denoted by reference D in FIG. 12) beyond the length of central section 80 of channel 28. This extra extension length D for the various wall elements of corner section 86 helps provide additional overall weld length areas for both the respective components between the lower extension length 106 and the mating weld surfaces of bottom panel assembly 24 on the end of channel 28, and also for the upper extension length 108 and its respective mating weld surfaces of top panel assembly 22 at the other end of channel 28. In the test unit made in accordance with this invention as described below relative to Test #1, the extra extension length distance D is at least approximately 3.0 inches, and preferably 3.8 inches.

There is shown in FIGS. 7 and 12 (with the weld length areas denoted by "X—X" reference lines for emphasis), the extensive lower weld length areas that are permitted with the present invention, primarily due to the lower extension length 106 of corner support 28 relative to bottom panel assembly 24 as well as the deep central V-channel section 80. Such extra long weld areas on assembly 24 (see "X—X" lines in FIGS. 7 and 12), occur along the lower edges of side raised panels portion 62, bent lip portion 68, and the end area of bent lip portion 66.

Similarly, as seen in FIGS. 4, 6 and FIG. 12 (again denoted by weld "X—X" reference lines), the upper extension length 108 of corner support 28 provides additional such weld length areas along top panel assembly 22. There, those extra length weld areas (see again "X—X" lines, for emphasis) occur along side drop panel portion 44, bent lip portion 50, and the end of bent lip portion 48, plus along top panel's drop panel edges 34, 36, as well as along chamfered corners 40, 42.

These extra weld length areas are further depicted in the series of FIGS. 14a, 14b, 15a and 15b, where in perspective view the respective upper and lower ends of the main corner support channels 28 are shown as welded along the extra long weld length areas again depicted by "X—X" lines for emphasis. These weld length areas run both horizontally and vertically at essentially all areas where the extension lengths 106, 108 of channel 28 meet the respective upper and lower panel assemblies 22, 24. Thus, the extra length weld areas of a frame unit made in accordance with the present invention (such as the test unit of Test #1 described below) provides approximately some 10 inches of weld length per each upper and lower end of a given corner support channel 28. This contrasts, for example, to only some 7 inches of weld length available at each end of the corner channels of a unit made in accordance with U.S. Pat. No. 5,639,150.

Such a substantiated increase in the running weld length areas, as compared to known prior art frame units, is collectively due to i) extension lengths 106, 108 formed at the top and bottom ends of each main corner support channel 28, ii) the deep extension of the central V-groove section 80 created by angled side walls 84, 84 on each channel 28, and iii) the presence of formed upper and lower panel assembles 22,24 to which the respective channel extensions lengths 106, 108 can be integrally fastened by welding. Plus, such increased running weld length areas actually collectively occur at four different locations along the top, and four different places along the bottom, of the frame 20.

Importantly, such extra weld length areas (provided along the lower and upper extension lengths 106, 108, of each main corner support channel 28), collectively operate to greatly enhance the overall strength of the present equipment frame 20. Further, there is substantially more strength provided by such a welded-up integral attachment of the upper and lower panel assemblies 22, 24, than was available when separate top and bottom panels were simply bolted on to a frame, such as was done in the frame units disclosed in U.S. Pat. No. 5,639,150.

One frame made in accordance with the present invention, and where the preferred 11-gauge steel material was used, was tested for the then current Seismic 4 test guidelines. There, the overall height of the frame being tested was some 89 inches, the frame's width (i.e. side-to-side dimension) was some 30 inches, and the frame's depth (from front face to rear face) was some 39 inches. Further, the depth dimension (see distance "S" in FIG. 13) between the respective levels of the first and second main walls 88, 100 and the bottom wall 82, was approximately 2 inches for each main corner support channel 28. Also, the overall width dimension for each support channel 28 (see dimension "W" in FIG. 13, between the respective end walls 92 and 102) was approximately 10 inches. Preferably, the flange wall 94 and bent lip 104 respectively extend from the first and second main walls 88, 100 to the same distance "S" as does the bottom wall 82. This further helps to maximize the strength present in each corner support channel 28, and to thereby help maximize the side-to-side force resistance provided by each channel 28 to the overall frame 20.

Figure 2:
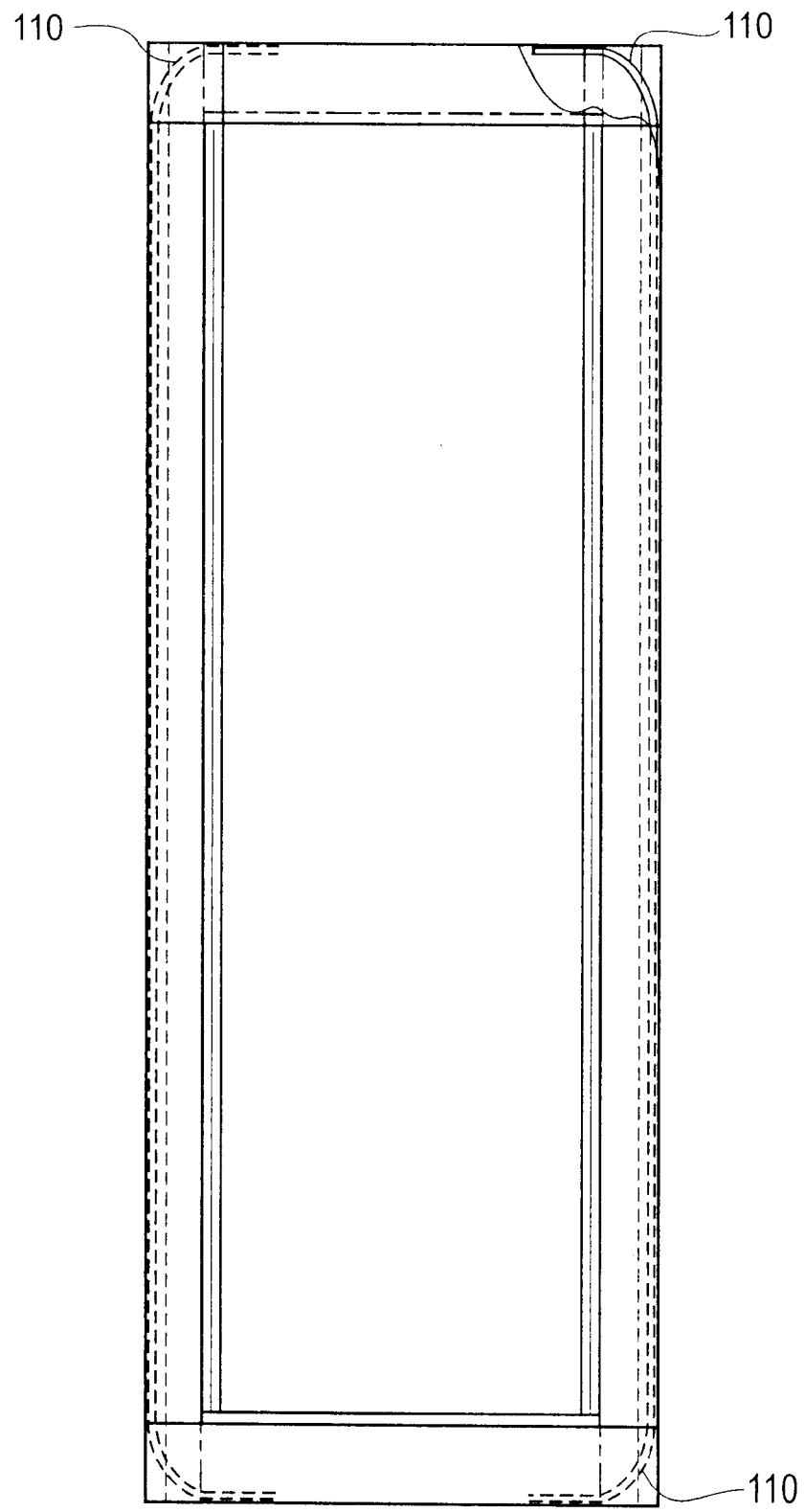
FIG. 2 is a front elevation view of the equipment frame of FIG. 1.

FIGS. 1, 2, 7 and 16 depict a series of (preferably 4) L-shaped stiffener tube members 110 which are rigidly affixed, e.g. welded, to bottom panel 54 at their lower end, and to both the lowest cross strut 30 and to inner end wall 102 (of corner support channel 28) at their upper end. Similarly, as seen in FIGS. 2 and 4, another series of (again preferably 4) such L-shaped stiffener tube 110 are welded to top panel 32 at their upper end, and to the uppermost cross strut 30 and again to inner end wall 102 (of channel 28) at their lowest end. These two series of upper and lower stiffener tubes 110, being integrally affixed to the frame 20, operate to yet further strengthen the overall equipment frame 20 against side-to-side vibration forces.

With the above-described dimensions for the frame made in accordance with the present invention, the overall weld length area available, for any one of the frame's eight corners, that is, any given corner at one end of support channel 28, again was approximately 10 running inches. That is approximately a 43 percent increase, i.e. improvement, over the best running weld length area of any known prior earthquake-resistant frame, such as one made under U.S. Pat. No. 6,293,637, and helps to greatly strengthen the present frame 20. Again this increase is due, in part, to the increased depth S of the bottom wall 82, and the overall length of extensions 106, 108 of channel 28. In sum, the entire integral, welded-together frame 20, comprising the main corner supports 28, bottom and top panel assemblies 22, 24, cross struts 30, and L-shaped tube stiffeners 110, has significant elastic capability in handling vibration-induced stress, as that welded combination of such separate parts tends to act overall as one part.

In Seismic 4 testing of equipment frames, one objective of the testing standard calls for a so-called "sweep measurement", i.e. or where movement happens, of at least 6.00 or greater, and with minimal front-to-rear and side-to-side deflections and with maximum permissible weight.

Testing of the above-described sample frame made in accordance with the invention occurred as follows:

TEST #1

| Shelf bottom to top arrangement | Dimension from base cowling (in inches) | Added component weight (in shelf weight pounds) | Added Load Weight | Total Weight | Distribution |
|---|---|---|---|---|---|
| Shelf 1 | 2¾ | 48.8 | 200 | 248.8 | 25% |
| Shelf 2 | 15⁹⁄₁₆ | 48.8 | 175 | 223.8 | 22% |
| Shelf 3 | 27⁵⁄₁₆ | 48.8 | 150 | 198.8 | 20% |

-continued

TEST #1

| Shelf bottom to top arrangement | Dimension from base cowling (in inches) | Added component weight (in shelf weight pounds) | Added Load Weight | Total Weight | Distribution |
|---|---|---|---|---|---|
| Shelf 4 | 39 9/16 | 48.8 | 100 | 148.8 | 15% |
| Shelf 5 | 51 13/16 | 48.8 | 75 | 123.8 | 12% |
| Shelf 6 | 66 15/16 | 48.8 | 15 | 63.8 | 6% |
|  |  | 292.8 | 715 | 1007.8 |  |

This Test #1 unit satisfactorily passed the Seismic 4 Test, and resulted in an acceptable sweep measurement of 6.8, side-to-side deflection of 1.55, front-to-rear deflection of 0.18, and carried a satisfactory total weight of 1007.8 pounds. The center of mass of the overall added load weight (shelving, additional equipment, and wiring) occurred at some 33 inches from the frame unit's base cowling.

A second frame, formed the same as that of Test #1, was tested with yet additional load weight, as follows:

TEST #2

| Shelf bottom to top arrangement | Dimension from base cowling (in inches) | Added component weight (in shelf weight pounds) | Added Load Weight | Total Weight | Distribution |
|---|---|---|---|---|---|
| Shelf 1 | 2 3/4 | 48.8 | 250 | 299 | 23% |
| Shelf 2 | 15 9/16 | 48.8 | 250 | 299 | 23% |
| Shelf 3 | 27 5/16 | 48.8 | 200 | 249 | 19% |
| Shelf 4 | 39 9/16 | 48.8 | 175 | 224 | 7% |
| Shelf 5 | 51 13/16 | 48.8 | 125 | 174 | 13% |
| Shelf 6 | 66 15/16 | 48.8 | 15 | 64 | 5% |
|  |  | 293.0 | 1015 | 1308 |  |

This Test #2 resulted in an acceptable sweep measurement of 6.13, side-to-side deflection of 2.15, front-to-rear deflection of 0.32, and carried a significant total weight of 1308 pounds. The center of mass of the overall added load weight occurred at 33 inches from the frame unit's base cowling. This unit, again passed the Seismic 4 Test.

Test #1 is a some 24 percent improvement, and the heavier-loaded Test #2 is a some 61 percent improvement, in permissible added weight over the best known prior art earthquake resistant electric equipment frame, namely, a unit made in accordance with U.S. Pat. No. 6,293,637, as owned by the present assignee.

Figure 18:
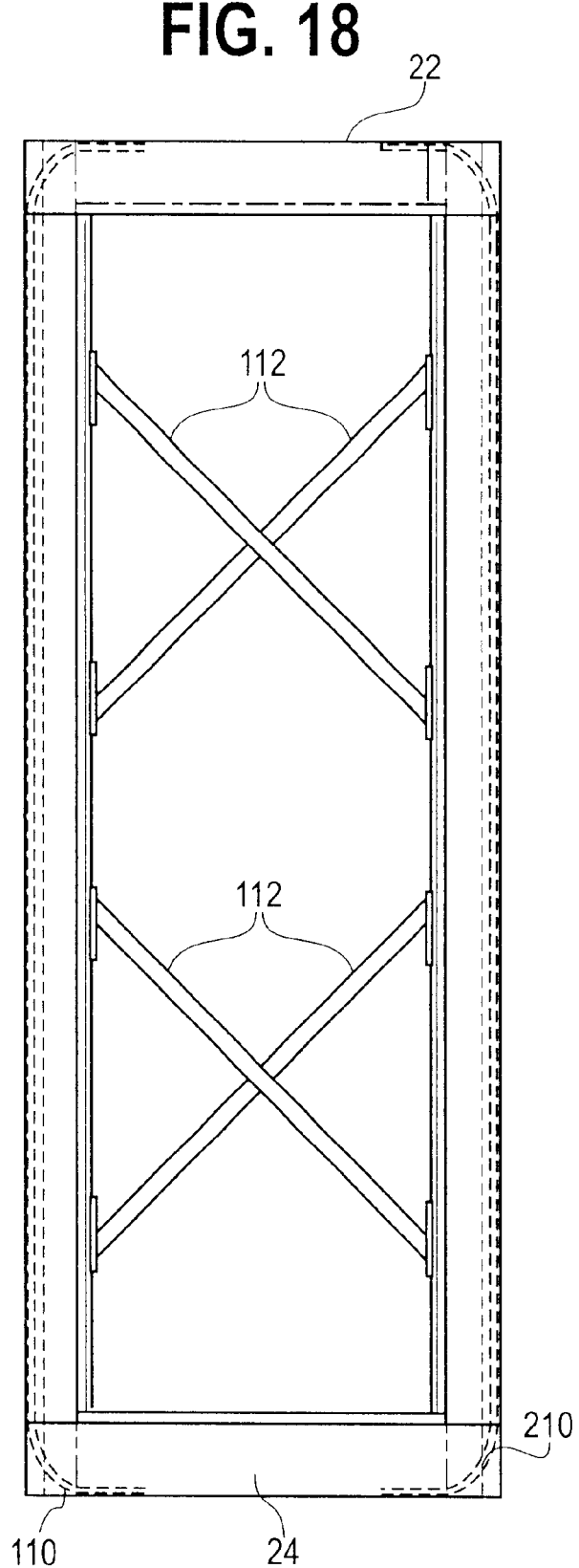
FIG. 18 is a rear elevation view that depicts an alternate embodiment of the equipment frame of FIG. 1, utilizing two sets of cross brace members as depicted in FIG. 17.

Turning to FIGS. 17 and 18, there is shown an alternate embodiment of the present equipment frame, generally denoted by references numeral 20', where all other components of the frame 20' are the same as equipment frame 20 with one exception. That exception is the presence of a double pair of diagonally-aligned cross braces 112 (see FIG. 17). Each cross brace 112 terminates at its respective ends in welded-on tong member 114. Those end tongs 114 allow each diagonal brace member 112 to be welded to each corner support channel 28, i.e. along the end wall 102, so that the cross braces 112 also become an integral part of the welded-up combination of members making up each frame 20N.

Testing of the same type frame as used in Tests #1 and #2, but modified to include two pairs of diagonal cross braces 112 as shown in FIG. 18, produced the following results:

TEST #3

| Shelf bottom to top arrangement | Dimension from base cowling (in inches) | Added component weight (in shelf weight pounds) | Added Load Weight | Total Weight | Distribution |
|---|---|---|---|---|---|
| Shelf 1 | 2 3/4 | 53.7 | 325 | 379 | 21% |
| Shelf 2 | 15 9/16 | 53.7 | 325 | 379 | 21% |
| Shelf 3 | 27 5/16 | 53.7 | 300 | 354 | 20% |
| Shelf 4 | 39 9/16 | 53.7 | 250 | 304 | 17% |
| Shelf 5 | 51 13/16 | 53.7 | 225 | 279 | 16% |
| Shelf 6 | 66 15/16 | 53.7 | 15 | 69 | 4% |
|  |  | 322.0 | 1,440.05 | 1762 |  |

This Test #3 (i.e. a frame of the present invention as modified to have the additional X-bracing) resulted in an even more acceptable sweep measurement of 6.96, a side-to-side deflection of 1.46, front-to-rear deflection of 0.38, and carried a significantly higher overall added load total of weight of 1762 pounds, again passing the Seismic 4 test. Here, and significantly, the added load weight's center of mass occurred at some 33 inches above the frame's base cowling. This particular Test #3 unit is, thus, at some 61 percent improvement, in permissible added load weight, over the unit made in accordance with U.S. Pat. No. 6,293, 637. Further, it is seen that the Test #3 unit, with the added cross bracing 112, has a some 117 percent improvement in the ability of frame 20 to withstand side-to-side vibration forces, even over the frame unit of Test #2.

Further yet, the above-described test units as made in accordance with the present invention are, respectively, a some 24 percent improvement (for Test Unit #1), a some 61 percent improvement (for Test Unit #2), and a some 117 percent improvement (for Test Unit #3), as to the increase in permissible height location for the center-of-mass (for the added weight) as compared to units made in accordance with U.S. Pat. No. 5,639,150, as also assigned to the assignee of the present invention.

In sum, the present invention provides a substantial increase (i.e. up to approximately a seventy-four percent increase) in permissible added load weight to the equipment frame, with less overall side-to-side deflection, and with a significant increase in sweep. This, in turn, allows the end-user of the present electronic equipment frame to add more weight to each shelf of the unit, and to increase the height at which that extra weight can be added, i.e. namely, at a location up to about sixty-five percent of the height of the overall cabinet.

From the foregoing, it is believed that those skilled in the art will readily appreciate the unique features and advantages of the present invention over previous types of electric equipment frames. Further, it is to be understood that while the present invention has been described in relation to particular preferred and alternate embodiments as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

We claim:

1. A metal frame apparatus for supporting electronic equipment against excessive vibration, comprising in combination, two respective side assemblies integrally connected by welding by a top panel assembly and a bottom panel assembly;

said top panel assembly having at least one of a front top edge and a rear top edge formed as chamfered;

each said side assembly including at least two corner support channel members rigidly connected to one another by a plurality of cross strut members;

each said corner support channel member having a flat-bottomed deep V-shaped channel portion comprising a bottom wall and two angled side walls, an outer corner section extending from one of said angled side walls comprising a first main extension wall, a chamfered corner wall, an outer end wall, and a flange wall, and an inner corner section extending from the other one of said angled side walls comprising a second main extension wall and an inner end wall, said two angled side walls extending to substantially the full depth of said respective outer and inner end walls;

and each said corner support channel member further having at each of the top and bottom ends thereof an extension length portion to permit, at each end of a said corner support channel member, an extended weld length area for the integral welded connection of said corner support channel member to said respective top and bottom panel assemblies.

2. The frame apparatus of claim 1, wherein said extension length portion extends from said outer corner section of said corner support channel member.

3. The frame apparatus of claim 1, and a return lip extending from the outer end of said flange wall on said outer corner section.

4. The frame apparatus of claim 1, and a bent lip extending from the outer end of said inner end wall of said inner corner section.

5. The frame apparatus of claim 1, wherein each said corner support channel member is formed of steel material of at least 11 gauge thickness.

6. The frame apparatus of claim 4, wherein said top and top panel assemblies are each formed of steel material of at least 11 gauge thickness.

7. The frame apparatus of claim 5, wherein said cross strut members are each formed of steel material of at least 11 gauge thickness.

8. The frame apparatus of claim 1, wherein said plurality of cross strut members comprise at least five said members.

9. The frame apparatus of claim 1, and a plurality of generally L-shaped bent tube stiffener members, with a first series of said bent tube members rigidly affixed to both said top panel assembly and said respective side assemblies, and a second series of said bent tube stiffener members rigidly affixed to both said bottom panel assembly and said respective side assemblies.

10. The frame apparatus of claim 1, wherein said extension length portion extends at least approximately 3 inches from the respective end of said corner support channel.

11. The frame apparatus of claim 10, wherein said extension length portion extends at least approximately 3.8 inches.

12. The frame apparatus of claim 9, wherein said L-shaped bent tube stiffener members are formed as square tube members.

13. The frame apparatus of claim 1, wherein each of said two angled side walls extend from the respective ends of said bottom wall at an angle of approximately 120°.

14. The frame apparatus of claim 1, and a plurality of anchor plates fastened to said bottom panel assembly to permit fastening of said frame apparatus to associated floor supports.

15. The frame apparatus of claim 1, and a pair of cross brace members each rigidly affixed at their ends to associated ones of said corner support channel members of said two respective side assemblies to provide additional strength against side-to-side vibrations.

16. The frame apparatus of claim 1, and wherein each of said top and bottom panel assemblies are formed with respective bent lip portions in the location of the ends of the respective said corner support channel members to permit additional areas for the integral welded connection of said corner support channel members to said top and bottom panel assemblies.

17. The frame apparatus of claim 1, and wherein the depth-to-width dimensional ratio for the configured cross section of each said corner support channel is no more than approximately 1 to 5.5.

18. The frame apparatus of claim 17, wherein said depth-to-width ratio is approximately 1 to 4.9.

19. The frame appears of claim 17 wherein said depth to width ratio is approximately 1 to 4.1.

20. The frame apparatus of claim 1, and wherein the permitted center-of-mass of the overall added load weight occurs at a height above the frame's said bottom panel; assembly, up to approximately 65 percent of the frame's overall height.

21. The frame apparatus of claim 1, and wherein the permitted center-of-mass of the overall added load weight occurs at a height above the frame's said bottom panel assembly of at least 60 percent of a frame's overall height.

* * * * *